(12) United States Patent
Fischer

(10) Patent No.: US 9,650,478 B2
(45) Date of Patent: May 16, 2017

(54) IMPACT MODIFIED INJECTION MOLDED BODY AND METHOD FOR THE PRODUCTION THEREOF

(71) Applicant: Lisa Draexlmaier GmbH, Vilsbiburg (DE)

(72) Inventor: Wolfgang Fischer, Dorfen (DE)

(73) Assignee: Lisa Draexlmaier GmbH, Vilsbiburg (DE)

( * ) Notice: Subject to any disclaimer, the term of this patent is extended or adjusted under 35 U.S.C. 154(b) by 0 days.

(21) Appl. No.: 14/860,825

(22) Filed: Sep. 22, 2015

(65) Prior Publication Data
US 2016/0083534 A1 Mar. 24, 2016

(30) Foreign Application Priority Data
Sep. 23, 2014 (DE) .......... 10 2014 113 752

(51) Int. Cl.
*C08J 5/00* (2006.01)
*C08L 23/12* (2006.01)

(52) U.S. Cl.
CPC .............. *C08J 5/00* (2013.01); *C08L 23/12* (2013.01); *C08J 2323/12* (2013.01); *C08J 2423/08* (2013.01); *C08J 2423/20* (2013.01); *C08J 2423/26* (2013.01)

(58) Field of Classification Search
CPC ...... C08J 5/00; C08J 2323/12; C08J 2423/08; C08J 2423/20; C08J 2423/26; C08L 23/12; C08L 2205/025; C08L 2205/03; B29C 39/003; B29C 41/003
See application file for complete search history.

(56) References Cited

U.S. PATENT DOCUMENTS

| 8,123,629 | B2 * | 2/2012 | Ladd et al. | ........ A63B 37/0062 473/376 |
| 2014/0378579 | A1 * | 12/2014 | Perfetti et al. | .......... C08L 67/06 523/436 |

FOREIGN PATENT DOCUMENTS

| CN | 103554667 A | 2/2014 |
| DE | 4425615 A1 | 1/1996 |
| DE | 69427539 T2 | 4/2002 |

* cited by examiner

*Primary Examiner* — Nathan M Nutter
(74) *Attorney, Agent, or Firm* — Finnegan, Henderson, Farabow, Garrett & Dunner LLP

(57) ABSTRACT

A molded body may comprise a thermoplastic matrix comprising a first polymeric material, a second polymeric material distributed in the thermoplastic matrix, and a third polymeric material enveloped by the second polymeric material. The first polymeric material, the second polymeric material, and the third polymeric material are compounded together. The first polymeric material may have a first molecular weight and a first polarity. The second polymeric material may have a second molecular weight different from the first molecular weight and a second polarity different from the first polarity. The third polymeric material may comprise a recycled material.

12 Claims, 1 Drawing Sheet

IMPACT MODIFIED INJECTION MOLDED BODY AND METHOD FOR THE PRODUCTION THEREOF

CROSS-REFERENCE TO RELATED APPLICATION

This application is based upon and claims the benefit of prior German Patent Application No. 10 2014 113 752.3, filed on Sep. 23, 2014, the entire contents of which are incorporated herein by reference.

TECHNICAL FIELD

The present disclosure relates to an impact-modified injection molded body that may comprise a thermoplastic polymer matrix, and a second and a third polymeric material, and to a method for the production thereof.

BACKGROUND OF THE DISCLOSURE

Plastic materials today account for between 15 and 20 percent by weight in automobile construction, and the trend is rising. These are frequently exterior and interior parts, wherein the corresponding visual, haptic and functional properties are imparted to the latter by adhesively bonding injection molded components with different surface decors. Rising requirements in regard to quality and cost effectiveness, as well as resource efficiency and global competitive pressure, increase the need to use recycled plastic materials.

Plastic parts may be used in particular as injection molded bodies for the interior of automobiles, such as for example instrument panels, door linings or center consoles. These may be provided with a decor or painted. In many applications in the automotive field, cost pressure and the shortage of petrochemical resources are leading to a greater acceptance of using recycled materials.

When plastic materials are used that contain thermoplastic, thermoset recycled materials that are either fiber-reinforced or not reinforced, or recycled fibers, good binding to the surrounding polymer matrix is needed so that no worsening of the mechanical properties occurs.

Binding of fibers, for example, can occur by way of complex surface treatment and activation of the particular fiber (such as glass fiber, carbon fiber, natural fiber). When recycled materials are used, these can be blended with the polymer and compounded using an extruder, or admixed directly to the pure polymer during the production operation and melted jointly in the injection molding machine, wherein a homogeneous mixture forms.

A challenge can be the poor thermodynamic compatibility of the material components, which may be attributable to the different polarities of the material components.

The trend of admixing an unrecycled plastic material to the recycled plastic materials may have disadvantages. For example, the recycled material may be admixed to the untreated plastic material in a certain proportion directly at the injection molding machine, or is previously compounded.

Polypropylene and reinforced polypropylene are plastic materials that can be inexpensive and may be used for injection molded parts. Due to the non-polar properties of polypropylene, admixing thermoset recycled plastic materials, for example, can be problematic because these generally comprise polar components in the molecule. Binding of the thermoset component to the polymer matrix, such as polypropylene, may be insufficient, causing partial or semi-partial separation to occur. The inadequate binding of the two components manifests can create worsened mechanical properties, such as reduced impact resistance values and notched bar impact values. Impact resistance can define a measure of the ability of the material to absorb shock energy and impact energy without breaking.

SUMMARY

Embodiments of the present disclosure may provide a body, an injection molded body, or a plastic molded body in which the binding or compatibility of thermoplastic and/or thermoset recycled materials, fiber-filled or unfilled, may be improved such that the resulting mechanical properties of the molded body satisfy demanding customer specifications and, at the same time, quality requirements in regard to the molded body are met.

Embodiments include an injection molded body, a method for the production thereof, and a process for the use thereof.

The injection molded body may comprise a thermoplastic polymer matrix comprising a first polymeric material, and a second and a third polymeric material, wherein the polymer matrix and the second polymeric material may have different weight average molecular weights and polarities. The second polymeric material may be used as an adhesion promoter for the third polymeric material and/or as an impact resistance improving agent for the molded body.

The second polymeric material may be already integrated as an internal adhesion promoter in the injection molded body with a thermoplastic polymer matrix. In the finished, cooled state, the adhesion-promoting component may at least regionally cover the third polymeric material. This may create a recycled material fraction, and create a fixed, impact resistance-improving bond between these components due to the differences in polarity of the first and second polymers and the recycled material. A fixed integration of the recycled material may provide the third polymeric material in the polymer matrix by means of the second polymeric material and in an increase in the impact resistance values and notched bar impact values of the molded body because a polar component covers the recycled material fractions and binds them in the polymer matrix.

Embodiments of the present disclosure include recycled material directly incorporated into the injection molding body. Thermoset recycled materials based on epoxy resin, phenolic resin, polyester resin or melamine resin, for example, can be incorporated into a non-polar polymer matrix, such as polypropylene.

Embodiments of the present disclosure may provide reduction of investment costs for the activation or pretreatment units during compounding of the recycled material, and reduction of disposal costs for thermoset recycled materials that cannot be recycled or are difficult to recycle.

According to embodiments of the present disclosure, a thermoplastic polymer matrix may be selected from the group consisting of, for example, acrylonitrile butadiene styrene (ABS), styrene acrylonitrile (SAN), polystyrene (PS), polycarbonate (PC), polyethylene (PE), polypropylene (PP), polyamide (PA) or mixtures thereof. These may also be fiber-reinforced.

The second polymeric material may be, for example, a functionalized thermoplastic polyolefin elastomer (POE), an olefin block copolymer (OBC), or a mixture thereof.

The third polymeric material may be a thermoset or thermoplastic material, for example a recycled material, based on, for example, epoxy, polyester, phenol/formaldehyde or melamine resins, or a carbon fiber material.

As examples, epoxy resins, phenolic resins, polyester resins or melamine resins may form the basis of the thermoset recycled materials. These recycled materials can be produced in carbon- or glass fiber-reinforced thermoset materials in the production of CFRP plastic materials in the automotive industry, for example. The thermoset recycled material may therefore be fiber-reinforced itself, in particular by means of glass fibers, carbon fibers and/or natural fibers.

The impact-modified injection molded body may contain the third polymeric material in an amount of 10 to 40% by weight.

The injection molded body may have a Charpy impact resistance value according to ISO 179-1/eA at 23° C. of greater than or equal to (≥) 20 kJ/m$^2$ and/or a Charpy impact resistance value according to ISO 179-1/eA at −30° C. of ≥11 kJ/m$^2$.

The injection molded body may have a Charpy notched bar impact value according to ISO 179-1/eU at 23° C. of ≥15 kJ/m$^2$ and/or a Charpy notched bar impact value according to ISO 179-1/eU at −30° C. of ≥6 kJ/m$^2$.

The second polymeric material can be melted and resolidified.

The second polymeric material is may be present in the injection molded body in an amount of 5 to 40% by weight, or 10 to 30% by weight, or 10 to 25% by weight, as examples. The second polymeric material may have an average molecular weight of 11,000 to 37,000 g/mol.

The thermoplastic polymer matrix and/or the second polymeric material may comprise microwave-couplable additives, wherein the microwave-couplable additives may contain carbon fibers, carbon nanotubes, graphene or the like.

A method for producing an impact-modified injection molding body according to the present disclosure may comprise the following steps:

a) compounding a thermoplastic polymer matrix material with at least one thermoplastic and/or thermoset recycled material;

b) extruding;

c) granulating; and d) injection molding the granules in an injection mold, wherein a second polymeric material may be admixed in at least one of step a) or step d), and wherein the polymer matrix and the second polymeric material may have different weight average molecular weights and polarities, and the second polymeric material may be suited as an adhesion promoter.

Production of the impact-modified molded body may be carried out either by admixing the adhesion promoter via the granules or not until the blending process at the injection molding machine.

In step a) or d), the compatibility of the third polymeric material with the thermoplastic polymer matrix and the impact resistance of the injection molded body may be increased by adding the second polymeric material.

A use of the injection molded body according to the disclosure may include the following steps:

a) melting and resolidifying the injection molded body, wherein the thermoplastic polymer matrix and the second polymeric material may partially form a phase separation, and accumulating the second polymeric material on the surface of the injection molded body; and b) adhesively bonding the injection molded body to a further component, such as a planar décor, for example, wherein the second polymeric material may act as an adhesive for joining the injection molded body to the further component.

Prior to and during the injection molding process, the thermoplastic polymer matrix and the second polymer component may initially be presented in the form of a substantially homogeneous mixture in injection molding. A modification of the impact-modified, surface-modifiable injection molded body may be carried out under the influence of heat, for example by heat or radiation, and subsequent cooling. Because of low average molecular weights and densities of the second polymer component and increased polarity of the same compared to the matrix material, the second polymer component can move freely within the polymer matrix during heating. During cooling, thermodynamically controlled phase separation may take place, which can be used as an adhesive function.

BRIEF DESCRIPTION OF THE FIGURE

The FIGURE shows a schematic representation of an injection molded body according to an embodiment of the present disclosure.

DETAILED DESCRIPTION

The embodiments of the present disclosure will be described in more detail hereafter based on non-limiting examples.

The examples show tables of different functionalized polyolefin elastomers (POE), olefin block copolymers (OBC) or the mixture thereof as the second polymeric material according to the present disclosure for use as impact modifiers.

The products known as "Infuse™" (Dow Chemical Company) olefin block copolymers (OBC) and "Affinity™"GA (Dow Chemical Company) polyolefin elastomers (POE, TPO), may, for example, form an impact resistance-improving starting point for use in the injection molded part.

Both polymers have low average molecular weights and densities compared to conventional polyolefins, but also a high polarity.

The "Infuse™" (Dow Chemical Company) olefin block copolymers (OBC) are ethylene and α-olefin copolymers, which are composed of alternating semicrystalline and elastomeric blocks or segments in a multi-block architecture that follows a statistical distribution and decisively contribute to the hot-melt adhesive functionality of the same.

The following tables show different properties of the "Affinity™" GA (Dow Chemical Company) polyolefin elastomers (POE, TPO) by way of example.

Table 1 shows Functionalized polyolefin elastomer "Affinity™ GA 1000R":

TABLE 1

AFFINITY ™ GA 1000R
Functionalized Polyolefin Elastomer

| Overview | Complies with: EU, No 10/2011 U.S. FDA 21 CFR 175.105 Consult the regulations for complete details. | | |
|---|---|---|---|
| Physical | Nominal Value (English) | Nominal Value (SI) | Test Method |
| Gardner Color | <5.00 | <5.00 | ASTM D3417 |
| MAH Graft Level | High | High | Dow Method |
| Volatile Matter | <0.15% | <0.15% | ASTM D3030 [1] |
| Mechanical | Nominal Value (English) | Nominal Value (SI) | Test Method |
| Tensile Strength | 271 psi | 1.87 MPa | ASTM D638 |
| Tensile Elongation (Break) | 170% | 170% | ASTM D638 |

TABLE 1-continued

AFFINITY ™ GA 1000R
Functionalized Polyolefin Elastomer

| Thermal | Nominal Value (English) | Nominal Value (SI) | Test Method |
|---|---|---|---|
| Glass Transition Temperature (DSC) | −72.4° F. | −58.0° C. | Dow Method |
| Melting Temperature (DSC) | 154° F. | 68.0° C. | Dow Method |
| Fill Analysis | Nominal Value (English) | Nominal Value (SI) | Test Method |
| Brookfield Viscosity (350° F. (177° C.)) | 13.0 Pa · s | 13.0 Pa · s | ASTM D1084 |

Notes
These are typical properties only and are not to be construed as specifications. Users should confirm results by their own tests.
[1] Modified for polyolefins. Change the temperature used to 100° C. +/− 3 and the amount of sample to 20 grams Table 2 shows physical properties of impact resistance-modifying "Affinity™ GA" polyolefin elastomers:

TABLE 2

| Polymer | Density (g/cm³) | Melt flow rate g/10 min (190°, 2.16 kg weight) | Viscosity cP @ 177° C. | $T_m$ (° C.) | $T_c$ (° C.) | % Crystallinity | $T_g$ (° C.) |
|---|---|---|---|---|---|---|---|
| AFFINITY ® GA 1900 POE | 0.87 | 1000 | 8200 | 68 | 54 | 16 | −58 |
| AFFINITY™ GA 1950 POE | 0.874 | 500 | 17000 | 70 | 53 | 18 | −57 |
| AFFINITY ® EG 8200 G POP | 0.87 | 5 | — | 63 | 46 | 16 | −53 |

Raw materials of the examples include:

a) polymer matrix made of polypropylene (PP)

b) "Infuse 9817": copolymer of ethylene and octene, melting point 120° C., flexural modulus 23 MPa, density 0.877 g/m3, melt flow rate 15 g/10 min prior to grafting and 4 g/10 min after grafting c) "Affinity™ GA" polyolefin elastomer d) CFRP (carbon fiber-reinforced plastic) recycled material

EXAMPLE 1

Infuse 9817 is mixed on an injection molding machine in an amount of 5 to 10% by weight with PP and 30% CFRP recycled material in the melt and is applied as a planar molded body.

"Affinity™ GA" polyolefin elastomer is mixed on an injection molding machine in an amount of 5 to 10% by weight with PP and 30% CFRP recycled material in the melt and is applied as a planar molded body.

Mechanical tests are conducted thereafter with the cool injection molded part.

Table 3 shows impact resistance values of the injection molded body containing recycled material and Infuse or Affinity:

TABLE 3

|  | Polypropylen + 30% CFK | Polypropylen + 30% CFK + 5% Affinity | Polypropylen + 30% CFK + 10% Affinity | Polypropylen + 30% CFK + 5% Infuse | Polypropylen + 30% CFK + 10% Infuse |
|---|---|---|---|---|---|
| Bar Impact Value 23 kJ/m$^2$ | 19 | 24 | 20 | 23 | 21 |
| Bar Impact Value −30 kJ/m2 | 11 | 13 | 13 | 11 | 15 |
| Notched Bar Impact Value 23 kJ/m2 | 14 | 17 | 18 | 16 | 14 |
| Notched Bar Impact Value −30 kJ/m2 | 6 | 7 | 11 | 6 | 12 |

Table 3 shows that the admixing of "Infuse" or "Affinity" as the second polymeric material brings about an increase in the impact resistance of the injection molded body.

EXAMPLE 2

Luvocom, a carbon fiber-reinforced PP (Lehmann and Voss) is mixed on an injection molding machine within an amount of 5 to 10% by weight Affinity in the melt and is applied as a planar molded body.

Mechanical tests are conducted thereafter with the cool injection molded part.

Table 4 shows impact resistance values for carbon fiber-reinforced polypropylene alone:

TABLE 4

|  | Polypropylen + 20% Carbon Fibers | Polypropylen + 20% Carbon Fibers + 5% Affinity |
|---|---|---|
| Bar Impact Value 23 kJ/m$^2$ | 12 | 13 |
| Bar Impact Value −30 kJ/m2 | 21 | 23 |
| Notched Bar Impact Value 23 kJ/m2 | 4 | 7 |
| Notched Bar Impact Value −30 kJ/m2 | 4 | 4 |

Table 4 shows that the admixing of "Infuse" or "Affinity" as the second polymeric material brings about an increase in the impact resistance of the injection molded body even when only fiber-reinforced polypropylene is used without thermoset recycled material.

Table 5 shows moduli of elasticity, tensile strength and flexural strength of the CRFP recycled material-containing injection molded body with Infuse or Affinity:

TABLE 5

|  | Polypropylene + 30% CFRP | Polypropylene + 30% CFRP + 5% Affinity | Polypropylene + 30% CFRP + 5% Affinity | Polypropylene + 30% CFRP + 5% Infuse | Polypropylene + 30% CFRP + 10% Infuse |
|---|---|---|---|---|---|
| Tensile modulus of elasticity in N/mm$^2$ | 2385 | 1757 | 1392 | 2143 | 1726 |
| Flexural modulus of elasticity in N/mm$^2$ | 2175 | 1746 | 1937 | 1931 | 2485 |
| Tensile strength in N/mm$^2$ | 16 | 14 | 12 | 14 | 12 |
| Flexural strength in N/mm$^2$ | 26 | 22 | 19 | 24 | 21 |

Table 6 shows moduli of elasticity, tensile strength and flexural strength for carbon fiber-reinforced polypropylene alone:

TABLE 6

|  | Polypropylene + 20% carbon fibers | Polypropylene + 20% carbon fibers + 5% Affinity |
|---|---|---|
| Tensile modulus of elasticity in N/mm$^2$ | 7462 | 6439 |
| Flexural modulus of elasticity in N/mm$^2$ | 6159 | 5377 |
| Tensile strength in N/mm$^2$ | 56 | 51 |
| Flexural strength in N/mm$^2$ | 70 | 62 |

Table 5 shows that the admixing of "Infuse" or "Affinity" as the second polymeric material brings about a decrease in the moduli of elasticity as well as in the tensile strength and flexural strength of the injection molded body containing CFRP recycled material. The rigidity of the molded body decreases.

Similarly, Table 6 shows that the admixing of "Infuse" or "Affinity" as the second polymeric material brings about a decrease in the moduli of elasticity and the rigidity as well as the tensile strength and flexural of the injection molded body. This decrease occurs even when only fiber-reinforced polypropylene is used without thermoset recycled material.

The fibers in plastic materials increase rigidity, strength, and moduli of elasticity. The fibers may act indirectly because they are fixedly integrated in the thermoset matrix. The property profile of the molded body may be defined by the compatibilized thermoset material, such as, for example, the recycled material. The resulting molded body can be heated using microwave radiation due to the presence of carbon fibers.

The FIGURE schematically shows the composition of an injection molded body after the injection molding process.

The injection molded body may comprise a thermoplastic polymer matrix, a thermoset or thermoplastic recycled material fraction, and at least a second polymeric material. The second polymeric material may be located in regions of the body.

The structure results from a thermoplastic polymer matrix material 2. The matrix may include, as examples, acrylonitrile butadiene styrene (ABS), styrene acrylonitrile (SAN), polystyrene (PS), polycarbonate (PC), polyethylene (PE), polypropylene (PP), polyamide (PA) or the mixtures thereof.

"Infuse™" (Dow Chemical Company) olefin block copolymers (OBC) and/or "Affinity™" GA (Dow Chemical Company) polyolefin elastomers (POE), which may be embodied as second polymer 3, are incorporated into this matrix. Second polymer 3 differs from the matrix material 2 by a lower average molecular weight and comparatively high polarity. Moreover, recycled material fractions 4 may be present in the matrix, which are enveloped by the second polymers 3, and fixedly integrated in the base polymer matrix 2.

Prior to the injection molding process, the thermoplastic polymer matrix 2 and second polymer 3 are present in the injection molding granules as a largely homogeneous mixture.

During injection molding, thermoplastic polymer matrix 2 and second polymer 3 may be accumulated in a thermodynamically controlled manner at the interfaces to the recycled material particles 4 or at the surfaces of the injection molded body 1, due to the lower average molecular weights and densities of the second polymers 3, and also because of an increased polarity compared to the matrix material 2. This results in compatibilization of the recycled material 4 with the polymer matrix 2 and improves impact resistance of the molded body 1.

Hot-melt adhesive functionality of olefin block copolymers (OBC) and/or thermoplastic polyolefin elastomers (POE), when embodied as second polymers 3, accumulated on the molded body surface are rendered usable by again heating and subsequently adhesively bonding the heated injection molded body 1 with a suitable decorative part. Heating may take place by way of microwave treatment, and may be supported by incorporated microwave-couplable additives. A separate adhesive application can be eliminated. The decorative part can be an elastic, planar laminating element, for example leather or synthetic leather.

The injection molded body 1 according to the present disclosure therefore may be a molded part that is easy and cost-effective to produce and has good mechanical properties. In the injection molded body 1, waste parts, which may be made of CFRP, are recycled in an ecofriendly manner.

The invention claimed is:

1. A molded body, comprising:
a thermoplastic matrix comprising a first polymeric material selected from the group consisting of acrylonitrile butadiene styrene (ABS), styrene acrylonitrile (SAN), polystyrene (PS), polycarbonate (PC), polyethylene (PE), polypropylene (PP), polyamide (PA), and mixtures thereof;
a second polymeric material distributed in regions of the thermoplastic matrix, the second polymeric material comprising a functionalized thermoplastic polyolefin elastomer (POE), an olefin block copolymer (OBC), or a mixture thereof; and
a third polymeric material enveloped by the second polymeric material, the third polymeric material comprising a thermoset or thermoplastic recycled material;
wherein the first polymeric material, the second polymeric material, and the third polymeric material are compounded together.

2. The molded body according to claim 1, wherein the recycled material is fiber-reinforced with one of glass fibers, carbon fibers or natural fibers.

3. The molded body according to claim 1, wherein the molded body contains 10% to 40% by weight of the third polymeric material.

4. The molded body according to claim 1, wherein a Charpy impact resistance value according to ISO 179-1/eA of the molded body is greater than or equals $20 \text{ kJ/m}^2$ at 23° C. or is greater than or equals $11 \text{ kJ/m}^2$ at −30° C.

5. The molded body according to claim 1, wherein a Charpy notched bar impact value according to ISO 179-1/eU of the molded body is greater than or equals $15 \text{ kJ/m}^2$ at 23° C. or is greater than or equals $6 \text{ kJ/m}^2$ at −30° C.

6. The molded body according to claim 1, wherein the second polymeric material is configured to be melted and resolidified.

7. The molded body according to claim 1, wherein the molded body contains 5% to 40% by weight of the second polymeric material.

8. The molded body according to claim 1, wherein the second polymeric material has a number average molecular weight of 11,000 to 37,000 g/mol.

9. The molded body according to claim 1, wherein at least one of the thermoplastic matrix or the second polymeric material comprises microwave-couplable additives.

10. The molded body according to claim 9, wherein the microwave-couplable additives comprise at least one of carbon fibers, carbon nanotubes, or graphene.

11. A method for producing a molded body, the method comprising:
compounding a thermoplastic polymer matrix with at least a recycled material, wherein the thermoplastic polymer matrix comprises a first polymeric material selected from the group consisting of acrylonitrile butadiene styrene (ABS), styrene acrylonitrile (SAN), polystyrene (PS), polycarbonate (PC), polyethylene (PE), polypropylene (PP), polyamide (PA), and mixtures thereof;
extruding the compounded materials;
granulating the extruded materials to produce granules; and
injection molding the granules;
wherein:
a second polymeric material is admixed with the first polymeric material during at least one of the compounding or the injection molding, the second polymeric material comprising a functionalized thermoplastic polyolefin elastomer (POE), an olefin block copolymer (OBC), or a mixture thereof; and
the recycled material comprises a thermoset or thermoplastic recycled material.

12. The method according to claim 11, wherein admixing the second polymeric material comprises admixing the second polymeric material in a manner that a compatibility between the recycled material and the thermoplastic polymer matrix increases, and an impact resistance of the molded body increases.

* * * * *